US009169765B2

(12) United States Patent
McConnell et al.

(10) Patent No.: US 9,169,765 B2
(45) Date of Patent: Oct. 27, 2015

(54) METHOD FOR REGENERATING A DIESEL PARTICULATE FILTER

(75) Inventors: Campbell R. McConnell, Vancouver (CA); Paul Sebright Towgood, Vancouver (CA)

(73) Assignee: WESTPORT POWER INC., Vancouver (CA)

(*) Notice: Subject to any disclaimer, the term of this patent is extended or adjusted under 35 U.S.C. 154(b) by 970 days.

(21) Appl. No.: 12/503,026

(22) Filed: Jul. 14, 2009

(65) Prior Publication Data

US 2010/0005788 A1 Jan. 14, 2010

Related U.S. Application Data

(60) Provisional application No. 61/080,604, filed on Jul. 14, 2008.

(51) Int. Cl.
*F01N 3/00* (2006.01)
*F01N 9/00* (2006.01)
*F01N 3/025* (2006.01)

(52) U.S. Cl.
CPC .............. *F01N 9/002* (2013.01); *F01N 3/0253* (2013.01); *F01N 2240/30* (2013.01); *F01N 2560/022* (2013.01); *F01N 2560/06* (2013.01); *F01N 2560/07* (2013.01); *F01N 2610/04* (2013.01); *F01N 2610/05* (2013.01); *F01N 2610/146* (2013.01); *F01N 2900/08* (2013.01); *Y02T 10/47* (2013.01)

(58) Field of Classification Search
CPC .......... F01N 2240/30; F01N 2560/022; F01N 2560/06; F01N 2560/07; F01N 2610/04; F01N 9/002; F01N 3/0253

USPC .................................................... 60/273, 295
See application file for complete search history.

(56) References Cited

U.S. PATENT DOCUMENTS

| | | | |
|---|---|---|---|
| 6,370,870 B1 | 4/2002 | Kamijo et al. | |
| 6,694,727 B1 | 2/2004 | Crawley et al. | |
| 6,823,664 B2 | 11/2004 | Nakatani et al. | |
| 6,964,156 B2 | 11/2005 | Liu et al. | |
| 7,076,944 B2 | 7/2006 | Okugawa et al. | |
| 7,082,753 B2 | 8/2006 | Dalla Betta et al. | |

(Continued)

FOREIGN PATENT DOCUMENTS

WO WO2007/069436 * 6/2007 ............... F01N 3/00

OTHER PUBLICATIONS

R. Zhan, Y. Huang, and M. Khair, "Methodologies to Control DPF Uncontrolled Regenerations," SAE Technical Paper No. 2006-01-1090 (2006).

*Primary Examiner* — Audrey K Bradley
*Assistant Examiner* — Jason Sheppard
(74) *Attorney, Agent, or Firm* — Corridor Law Group, P.C.

(57) ABSTRACT

A method of regenerating a diesel particulate filter involves directing an exhaust stream from a combustion engine through the diesel particulate filter and selectively introducing a syngas stream at least periodically into the diesel particulate filter to regenerate it. The syngas stream is introduced at a first average flow rate during an initial regeneration stage and at a second average flow rate during a subsequent regeneration stage. In preferred embodiments the flow rate is varied in order to reduce temperature spikes and/or the rate at which CO slips through the filter during regeneration. In certain embodiments the first average flow rate is lower than the second average flow rate.

19 Claims, 6 Drawing Sheets

(56) References Cited

U.S. PATENT DOCUMENTS

| | | |
|---|---|---|
| 7,181,906 B2 * | 2/2007 | Dalla Betta et al. ............. 60/286 |
| 7,225,608 B2 | 6/2007 | Audouin |
| 7,240,483 B2 | 7/2007 | Cizeron et al. |
| 7,275,365 B2 | 10/2007 | Zhan et al. |
| 7,412,823 B2 | 8/2008 | Reuter et al. |
| 2003/0143445 A1 * | 7/2003 | Daniel et al. .................... 429/19 |
| 2003/0200742 A1 | 10/2003 | Smaling |
| 2004/0244366 A1 * | 12/2004 | Hiranuma et al. ............... 60/286 |
| 2005/0274104 A1 | 12/2005 | Bromberg et al. |
| 2006/0179821 A1 | 8/2006 | Zhan et al. |
| 2007/0137106 A1 * | 6/2007 | Iverson et al. ............... 48/197 R |
| 2007/0199312 A1 * | 8/2007 | Kapparos et al. ............... 60/297 |
| 2007/0266701 A1 | 11/2007 | Cheng |
| 2008/0000219 A1 | 1/2008 | Ratcliff et al. |
| 2008/0000221 A1 | 1/2008 | Silvis |
| 2008/0006025 A1 | 1/2008 | McCarthy |
| 2008/0022660 A1 | 1/2008 | Reuter et al. |
| 2008/0066454 A1 | 3/2008 | Viola |
| 2008/0083212 A1 | 4/2008 | Ament et al. |
| 2008/0209891 A1 * | 9/2008 | Johannes et al. ................ 60/287 |
| 2008/0314032 A1 | 12/2008 | Li et al. |
| 2009/0071131 A1 * | 3/2009 | Phillips et al. .................. 60/286 |
| 2009/0126347 A1 | 5/2009 | Gabe et al. |
| 2009/0165444 A1 * | 7/2009 | Oosumi ........................... 60/286 |
| 2011/0041815 A1 * | 2/2011 | Henriksson et al. ........... 123/564 |

* cited by examiner

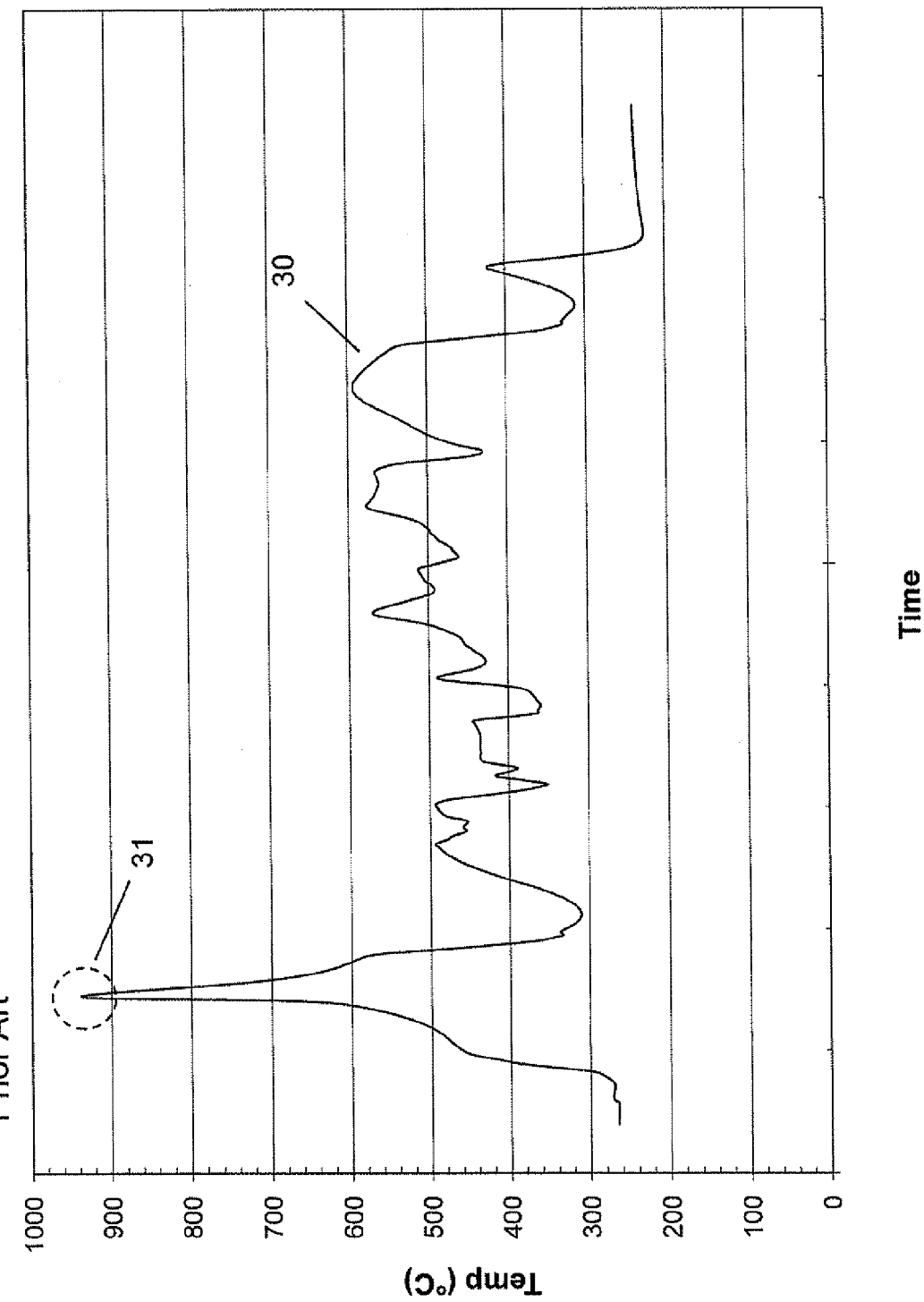

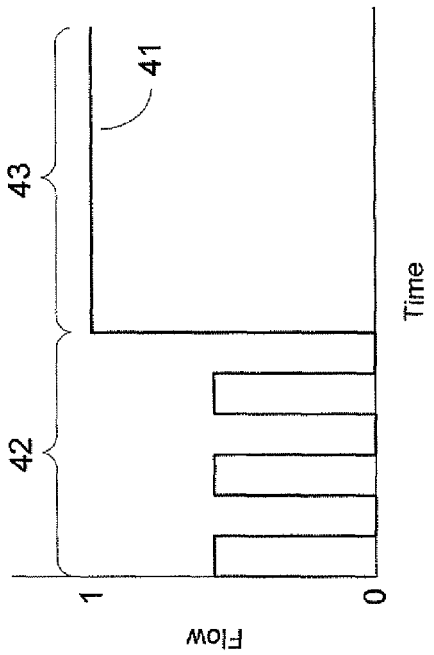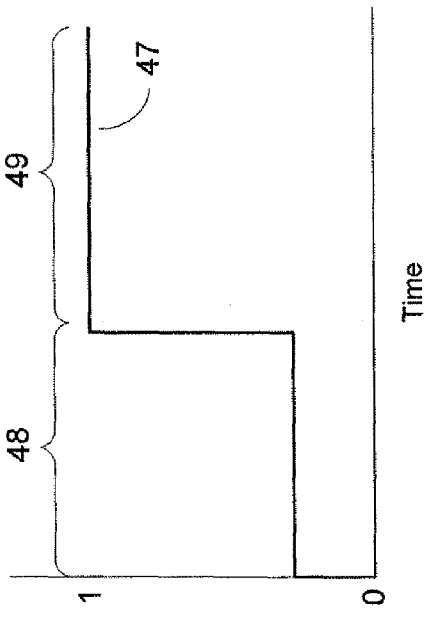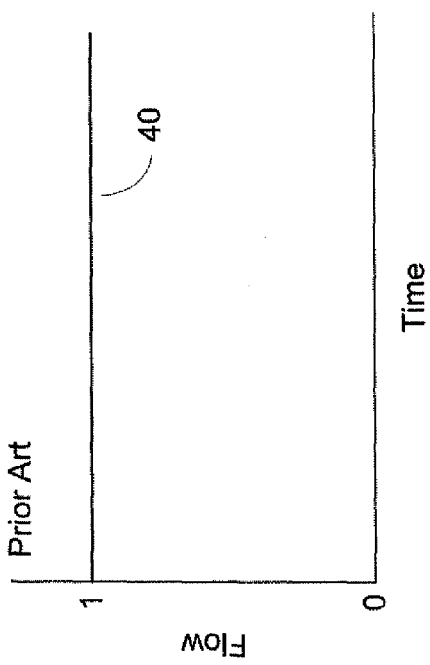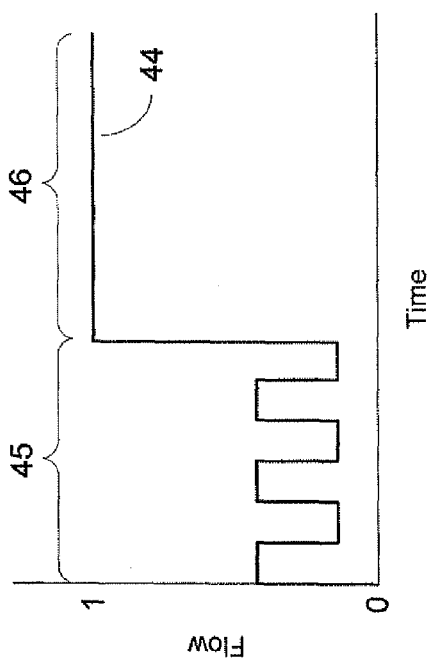

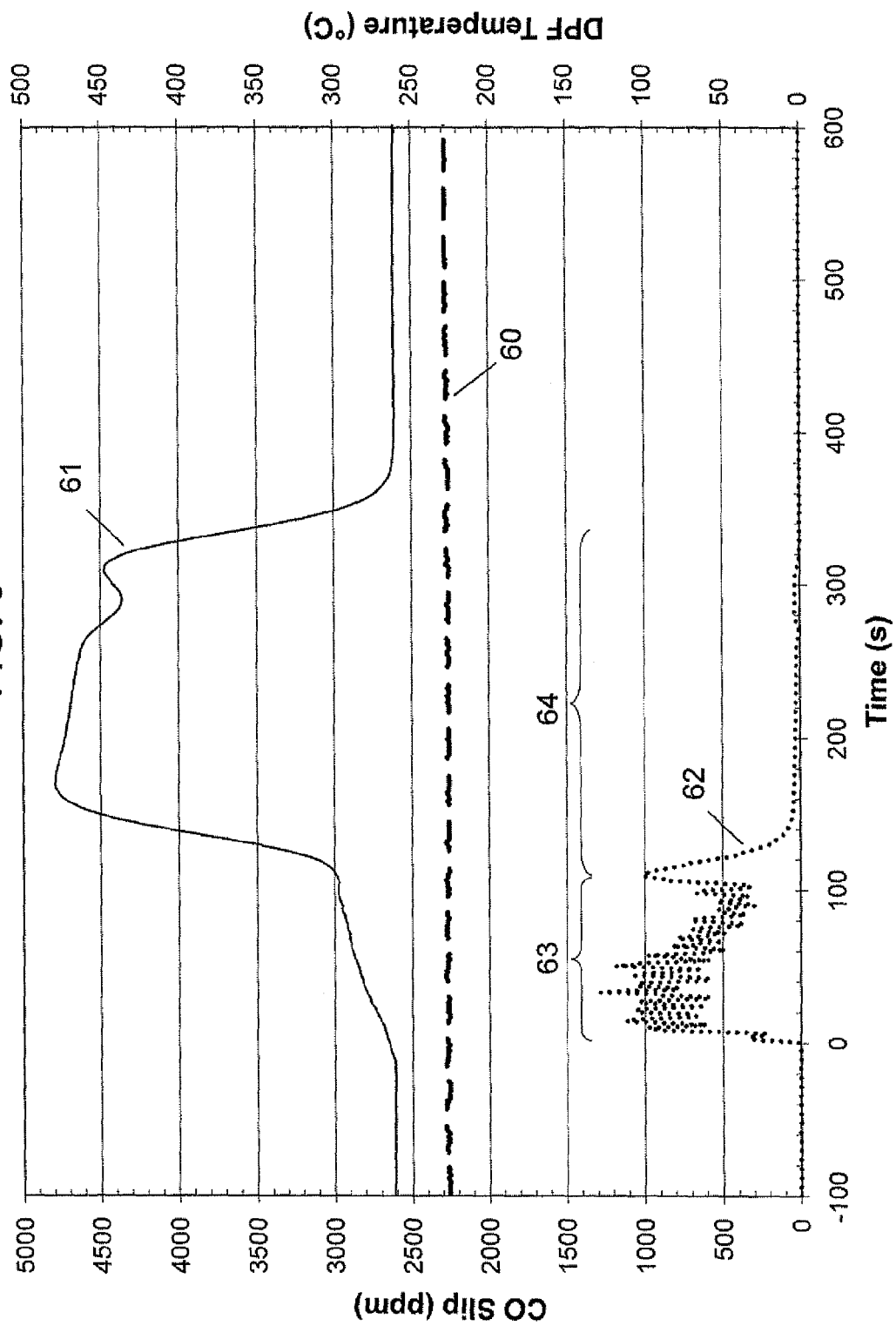

METHOD FOR REGENERATING A DIESEL PARTICULATE FILTER

CROSS-REFERENCE TO RELATED APPLICATION

This application is related to and claims priority benefits from U.S. Provisional Patent Application Ser. No. 61/080,604, entitled "Method for Regenerating a Diesel Particulate Filter", filed on Jul. 14, 2008, which is hereby incorporated by reference in its entirety.

FIELD OF THE INVENTION

The present invention relates to a method for regenerating a diesel particulate filter in a combustion engine emissions reduction exhaust after-treatment system, where the engine can be part of a vehicular or non-vehicular system. In particular the invention relates to a method to actively regenerate a diesel particulate filter using a gas stream containing hydrogen and carbon monoxide where the stream is introduced with a varying flow rate during the regeneration process.

BACKGROUND OF THE INVENTION

Diesel particulate filters (DPF), also known as particulate filters, particulate traps, soot filters or soot traps, can be employed in a combustion engine emissions reduction exhaust after-treatment system to reduce the levels of particulates in an exhaust stream of the engine. The particulate matter, produced during the combustion process of an engine, can comprise a variety of components including, for example, elemental carbon, hydrocarbons and sulfates. Particulates in the engine exhaust stream are trapped by the DPF until the accumulation of particulates adversely affects the flow of the exhaust stream through the DPF. This can occur when the accumulated particulates obstruct the filter causing the pressure drop across the filter to be undesirably high. An oxidation process can be used to regenerate the DPF in situ from time to time, allowing the DPF to continue to trap particulates.

A prior approach to actively regenerate a DPF involves increasing the temperature of the exhaust stream to a suitable regeneration temperature, or lowering the temperature at which regeneration occurs, by the periodic introduction of a hydrogen-containing gas stream (or other fuel) into the exhaust stream upstream of the DPF. As the mixed gas stream travels downstream and through the DPF, the mixed gas stream can be heated by catalytic combustion of the mixture promoted by an optional catalyst located upstream of and/or within the DPF. The regeneration process is an exothermic process which can be initiated above a threshold temperature, for example, above about 600° C. for a DPF without catalysts and above about 400° C. for a DPF with catalyst, and requires the presence of oxygen in the exhaust stream. The regeneration process can be self-sustaining provided there are sufficient amounts of heat, oxygen and particulates.

The oxidation of particulates can generate a large amount of heat in a short period of time. The heat generated is dependent on factors including, for example, the amount and composition of particulates accumulated in a DPF, the oxygen content of an exhaust stream, the mass flow of the exhaust stream, and heat transfer from the DPF to an exhaust stream. Under certain operating conditions including, for example, at elevated exhaust stream temperatures, with elevated oxygen content in an exhaust stream and/or with excessive amounts of fuel introduced, one or more high temperature spikes can be generated near the start of a regeneration process due to the initial reaction of easily oxidized components of the accumulated particulates. Exposure of the DPF to excessive temperatures can reduce the efficiency and/or durability and operating lifetime of the filter, for example, due to sintering and deactivation of the catalyst, high thermal stress, and cracking of components.

A fuel reformer or syngas generator can be employed to create a hydrogen ($H_2$) and carbon monoxide (CO) containing gas, commonly referred to as a syngas, for the regeneration process. Advantages of using a syngas as a fuel or reactant to regenerate a DPF can include, for example, potential to lower the threshold temperature suitable for the regeneration process, ability and ease of varying the syngas composition and flow, and ability to supply a fuel without the requirement to alter the operating condition of an engine. A shortcoming of using syngas and other fuels to regenerate a DPF can be the potential for CO to slip past the DPF when a catalyst and/or DPF are below a threshold temperature value.

The present approach overcomes at least some of the shortcomings of the prior DPF regeneration techniques and offers additional advantages. The present approach seeks to reduce the exposure of the DPF to high temperature spikes and to reduce the amount of CO slip past the DPF during the regeneration process. This can increase the durability of the DPF and reduce regulated emissions form the engine.

SUMMARY OF THE INVENTION

A method of regenerating a diesel particulate filter comprises directing an exhaust stream from a combustion engine through the diesel particulate filter and selectively introducing a syngas stream at least periodically into the diesel particulate filter to regenerate it. The syngas stream is introduced at a first average flow rate during an initial regeneration stage and at a second average flow rate during a subsequent regeneration stage. The first and second average flow rates (for example, mass flow rates) can be predetermined or can be selected based on one or more sensed parameters, such as the exhaust stream temperature, exhaust stream flow rate (for example, mass flow rate) or the speed of the combustion engine.

Aspects of the method can also include sensing the temperature of the exhaust gas stream at a location downstream of the combustion engine, and commencing the initial regeneration stage of the diesel particulate filter by introducing the syngas stream at a first average flow rate only when the sensed temperature reaches a first temperature threshold value. In some embodiments of the method of the first average flow rate and second average flow rate are selected based on the flow rate and the temperature of the exhaust stream sensed at a location downstream of the combustion engine. In other embodiments of the method the first average flow rate and second average flow rate are selected based on a speed of the combustion engine and the temperature of the exhaust stream sensed at a location downstream of the combustion engine.

In some embodiments of the method the syngas is introduced into the diesel particulate filter syngas at the first average flow rate for a predetermined time period and then introduced into the diesel particulate filter at the second average flow rate once the predetermined time period has elapsed, and/or once the sensed temperature exhaust stream temperature reaches a second threshold temperature value. In other embodiments of the method, syngas introduction into the diesel particulate filter is switched from a first average flow rate to a second average flow rate based on the CO concentration in the exhaust stream downstream of the diesel particulate filter, for example, based on an output from a CO concentration sensor located downstream of the diesel particulate filter.

In further aspects, a method of regenerating a diesel particulate filter comprises directing an exhaust stream from a combustion engine through the diesel particulate filter, and selectively introducing a syngas stream at least periodically into the diesel particulate filter to regenerate the diesel particulate filter, wherein the rate at which the syngas stream is introduced is metered and varied in order to reduce the amount of CO slip from the diesel particulate filter. The method can further comprise sensing the CO concentration in the exhaust stream downstream of the diesel particulate filter and varying the rate at which the syngas stream is introduced into the diesel particulate filter based on the sensed CO concentration.

BRIEF DESCRIPTION OF THE DRAWING(S)

FIG. 3 is a graph of an example plot of a temperature profile of a DPF during a regeneration process, illustrating a temperature spike (known in the art).

FIG. 4a is a graph of an example plot of syngas flow introduced into an exhaust stream over a DPF regeneration period, illustrating a continuous flow regime at a substantially constant flow rate (known in the art).

FIG. 4b is a graph of an example plot of syngas flow introduced into an exhaust stream over a DPF regeneration period, illustrating an intermittent flow regime followed by a continuous flow regime at a substantially constant flow rate.

FIG. 4c is a graph of an example plot of syngas flow introduced into an exhaust stream over a DPF regeneration period with a continuous but pulsed flow regime at a first average flow rate followed by a continuous flow regime at a second substantially constant flow rate. The first average flow rate has a square wave profile.

FIG. 4d is a graph of an example plot of syngas flow introduced into an exhaust stream over a DPF regeneration period with a continuous flow regime at a first substantially constant flow rate followed by a continuous flow regime at a higher second substantially constant flow rate.

FIG. 6 is a graph illustrating plots of an example exhaust stream temperature near the inlet to a DPF, internal temperature of the DPF and CO slip during a regeneration process. Syngas was introduced to the exhaust stream upstream of the DPF with an intermittent flow regime and at a first average flow rate followed by a continuous flow regime at a second substantially constant flow rate.

DETAILED DESCRIPTION OF PREFERRED EMBODIMENT(S)

A syngas generator can be employed to create a hydrogen ($H_2$) and carbon monoxide (CO) containing gas (syngas) to actively regenerate a diesel particulate filter (DPF) of an exhaust after-treatment system of a combustion engine. The syngas can be introduced and mixed with an exhaust stream upstream of the DPF and optional catalyst which can be located upstream of or within the DPF. As the mixed gas stream flows downstream contacting the catalyst (if present) an exothermic reaction occurs which can raise the temperature of the exhaust stream, DPF and particulates to a suitable regeneration temperature. Depending on various factors including, for example; temperature, oxygen content and flow rate of the exhaust stream; mass, thermal capacity, and temperature of the DPF; and flow rate and composition of the syngas, the temperature of a mixed gas stream and DPF may not increase at a rate sufficient to enable complete or near-complete oxidation of CO, which can allow an undesirable amount of CO to slip past the DPF and exhaust after-treatment system. As the exhaust stream, DPF and particulates reach and/or exceed the regeneration temperature, oxygen present in the exhaust stream enables the oxidation and gasification of particulates, which are then carried away from the engine system by the exhaust stream. The regeneration process can be terminated by various means including, for example, oxidizing or removing most particulates from the DPF, reducing the oxygen content and/or reducing the temperature of the exhaust stream or DPF by terminating the flow of syngas and/or increasing the flow rate of the exhaust stream.

Figure 1:
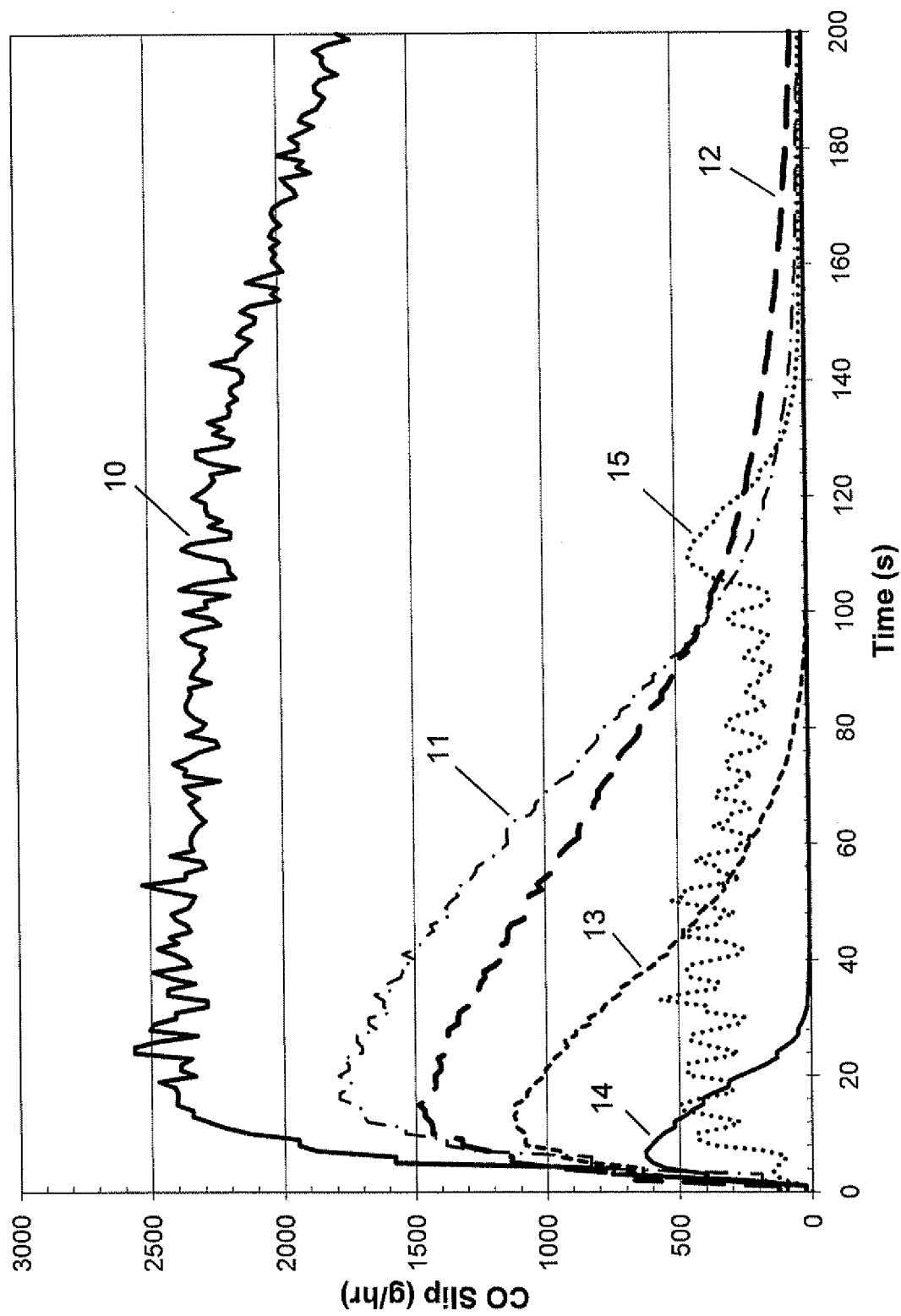
FIG. 1 is a graph illustrating various plots of example carbon monoxide (CO) slip past a DPF at different exhaust stream temperatures, where syngas was introduced with a continuous flow regime at a substantially constant flow rate, and in one case where syngas was introduced with an intermittent flow regime.

FIG. 1 is a graph illustrating various plots of example carbon monoxide (CO) slip past a DPF. Syngas was introduced into an exhaust stream upstream of a DPF. The exhaust stream temperatures were varied and plots of CO slip (CO flowing out of or slipping past the DPF) over time were measured and recorded. The introduction of syngas at a substantially constant flow rate with a continuous flow regime is known in the art. Plots 10-14 illustrate the CO slip when syngas was introduced at a substantially constant flow rate with a continuous flow regime at various exhaust stream temperatures. The exhaust stream temperatures of the various plots are as follows: plot 10 at 200° C., plot 11 at 225° C., plot 12 at 249° C., plot 13 at 273° C., plot 14 at 287° C. These plots illustrate that the amount of CO slip decreases as the exhaust gas temperature increases. Plot 15 illustrates CO slip when syngas was introduced with an intermittent flow regime (switching the flow of syngas to the exhaust stream on and off) with an exhaust stream temperature of 225° C. The average syngas flow rate used to generate plot 15 is lower than the syngas flow rate used for plot 11. Comparing plot 11 to 15 illustrates that the CO slip was reduced through the use of a lower average flow rate which was accomplished by an intermittent syngas flow regime.

Figure 2:
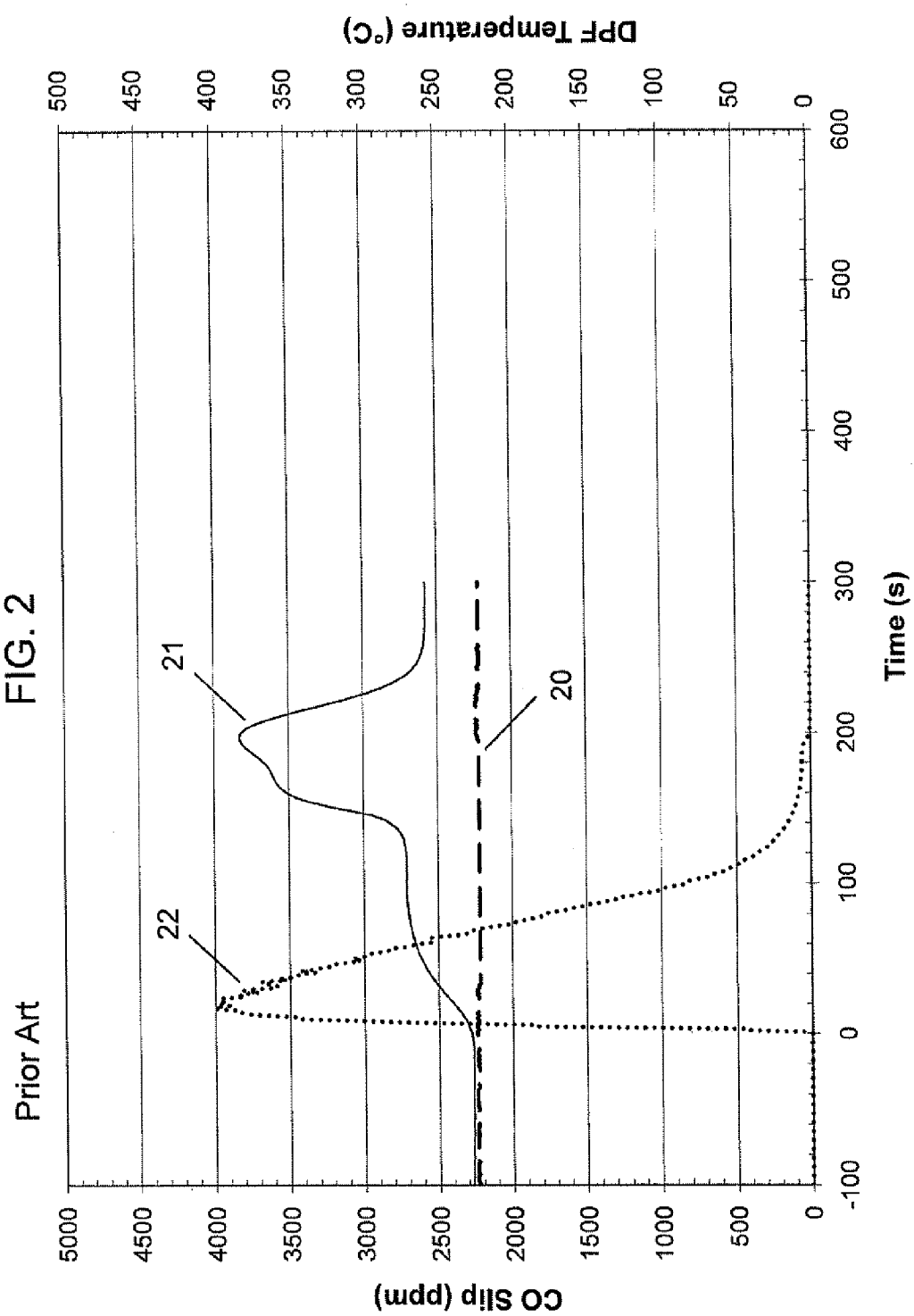
FIG. 2 is a graph illustrating plots of an example exhaust stream temperature near the inlet to a DPF, internal temperature of the DPF and CO slip during a regeneration process. Syngas was introduced to the exhaust stream upstream of the DPF at a substantially constant flow rate and with a continuous flow regime (known in the art).

FIG. 2 is a graph illustrating plots of an example exhaust stream temperature near the inlet to a DPF, internal temperature of the DPF and CO slip past the DPF during a regeneration process. Plot 20 illustrates the temperature of the exhaust stream near the inlet to the DPF. Plot 21 illustrates the internal temperature of the DPF. Plot 22 illustrates CO slip past the DPF. Syngas was introduced to the exhaust stream upstream of the DPF at a substantially constant flow rate and with a continuous flow regime (known in the art). FIG. 2 shows that there is significant CO slip until the temperature of the DPF increases above a threshold temperature.

FIG. 3 is a graph illustrating a plot of an example temperature profile of a DPF during a regeneration process, illustrating a temperature spike near the start of regeneration (known in the art). Syngas was introduced into the exhaust stream upstream of the DPF at a substantially constant flow rate and with a continuous flow regime. Plot 30 is a measured temperature of the DPF while temperature peak 31 is an initial temperature spike which can occur due to early stage or rapid exothermic oxidation reactions of, for example, soluble organic fractions, aerosols, and/or volatile particles. The high initial reaction rate or temperature spike can exceed a desired operating temperature threshold of the DPF, causing damage.

FIG. 4a is a graph of an example plot of a syngas flow introduced into an exhaust stream over a DPF regeneration period. Plot 40 illustrates a continuous flow regime at a substantially constant flow rate (known in the art).

In a preferred method of regenerating a DPF, the mass flow of syngas can be regulated and introduced into the exhaust stream upstream of an optional catalyst and DPF at a first average flow rate followed by a second average flow rate. In a preferred embodiment, the first average flow rate can be achieved by cycling the flow of syngas on and off (intermittent flow regime) for at least a portion of a regenerating process of the DPF. The temperature of the exhaust stream can be monitored or sensed at a location downstream of the combustion engine, for example, at the optional catalyst or at the inlet to the DPF or within the DPF. Preferably syngas is introduced for regeneration of the DPF when the sensed temperature of the exhaust stream is above a first threshold temperature value. The first temperature threshold is typically a value at which the amount of CO slip is at or below an acceptable level, or at which the optional catalyst can at least partially oxidize the CO in the syngas stream. FIG. 4b is a graph of an example plot of syngas flow introduced into an exhaust stream over a DPF regeneration period, illustrating an intermittent flow regime followed by a continuous flow regime. Plot 41 illustrates a flow rate of syngas over the regeneration period of a DPF. Period 42 represents an initial stage of a regeneration process where the flow regime of syngas is intermittent and with a lower average flow rate than for period 43 which represents a subsequent or final stage of a regeneration process. The flow rate for period 43 is shown as substantially constant flow, but need not be. An algorithm can be employed to determine a first heating value or the first average flow rate of the syngas stream desired in order to raise the temperature of the exhaust stream from the first threshold temperature value to a second threshold temperature value during an initial stage of a regeneration process. The algorithm can also be employed to switch from an initial stage of a regeneration process in which syngas is supplied at a first average flow rate, to a subsequent stage of a regeneration process in which syngas is supplied at a second average flow rate. The switch can be based on one more or sensed parameters including, for example, elapsed time and the temperature of the exhaust stream at a location downstream of the combustion engine. Furthermore, the algorithm can be employed to determine a second heating value or a second average flow rate of a syngas stream desired in order to raise the temperature of the exhaust stream at a location downstream of the combustion engine from the second threshold temperature value to a third threshold temperature value or sustain it at the second threshold temperature. FIG. 4c is a graph of an example plot of a syngas flow introduced into an exhaust stream over a DPF regeneration period with a continuous flow regime (syngas being introduced at all relevant times during regeneration). Plot 44 illustrates a flow rate of syngas over the regeneration period of a DPF. Period 45 represents the initial stage of a regeneration process where the flow regime of syngas is continuous but pulsed or varied, with a square wave profile. Other wave profiles can be used. The average flow rate in period 45 is lower than the average flow rate for period 46 which represents a subsequent or final stage of the regeneration process. The flow rate for period 46 is shown as a substantially constant flow, but need not be. FIG. 4d is a graph of an example plot of syngas flow introduced into an exhaust stream over a DPF regeneration period with a continuous flow regime at a first substantially constant flow rate followed by a continuous flow regime at a second substantially constant flow rate. Plot 47 illustrates a flow rate of syngas over the regeneration period of a DPF. Period 48 represents an initial stage of the regeneration process where the flow regime of syngas is continuous at a substantially constant at a lower average flow rate than for period 49 which represents a subsequent or final stage of the regeneration process. The flow rate for period 49 is at a substantially constant flow, but need not be. FIGS. 4b-4d illustrates a few examples of improved syngas flow regimes in which the syngas flow rate is varied during the DPF regeneration process. Actual flow rates, profiles, durations, and number of cycles or stages can vary.

Control of the flow of syngas can be achieved by various means including, for example, adjusting or switching on and off a valve fluidly connected to the syngas stream, at least periodically diverting the supply of syngas away from the DPF (for example, by directing a portion of the syngas stream to another syngas-consuming device or by directing a portion of the syngas stream to another DPF device or portion), switching a syngas generator on and off or varying the output of the syngas generator, or employing one or more flow control devices. Alternatively, the composition of the syngas produced by a syngas generator can be varied, adjusting the amount of $H_2$ and/or CO supplied, for example, to introduce a stream with a lower $H_2$ and/or CO content. After the temperature of the exhaust stream sensed at a location downstream of the combustion engine exceeds a second threshold temperature and/or a predetermined time period has elapsed, the mass flow of syngas can be increased, reduced, varied and/or switched to a different flow regime, for example, continuous or substantially constant flow, or intermittent, to achieve a third temperature threshold in the DPF and/or catalyst. The second and third threshold temperature values can be the same or different values. In other words the second average flow rate can raise the exhaust stream temperature to a higher third threshold temperature, or sustain it at a third threshold temperature that is the same as the second threshold temperature. A plurality of flow rates and regimes can be employed in the regeneration process. Thus, the control of the regeneration process and flow regime of the syngas can be achieved through sensing parameters indicative of, for example, the temperature and pressure drop across a DPF, the engine speed, the flow rate, pressure, CO concentration and temperature of the engine exhaust stream, and elapsed time, by employing, for example, controllers, algorithms, sensors, valves, switches, circuits and other devices.

Figure 5:
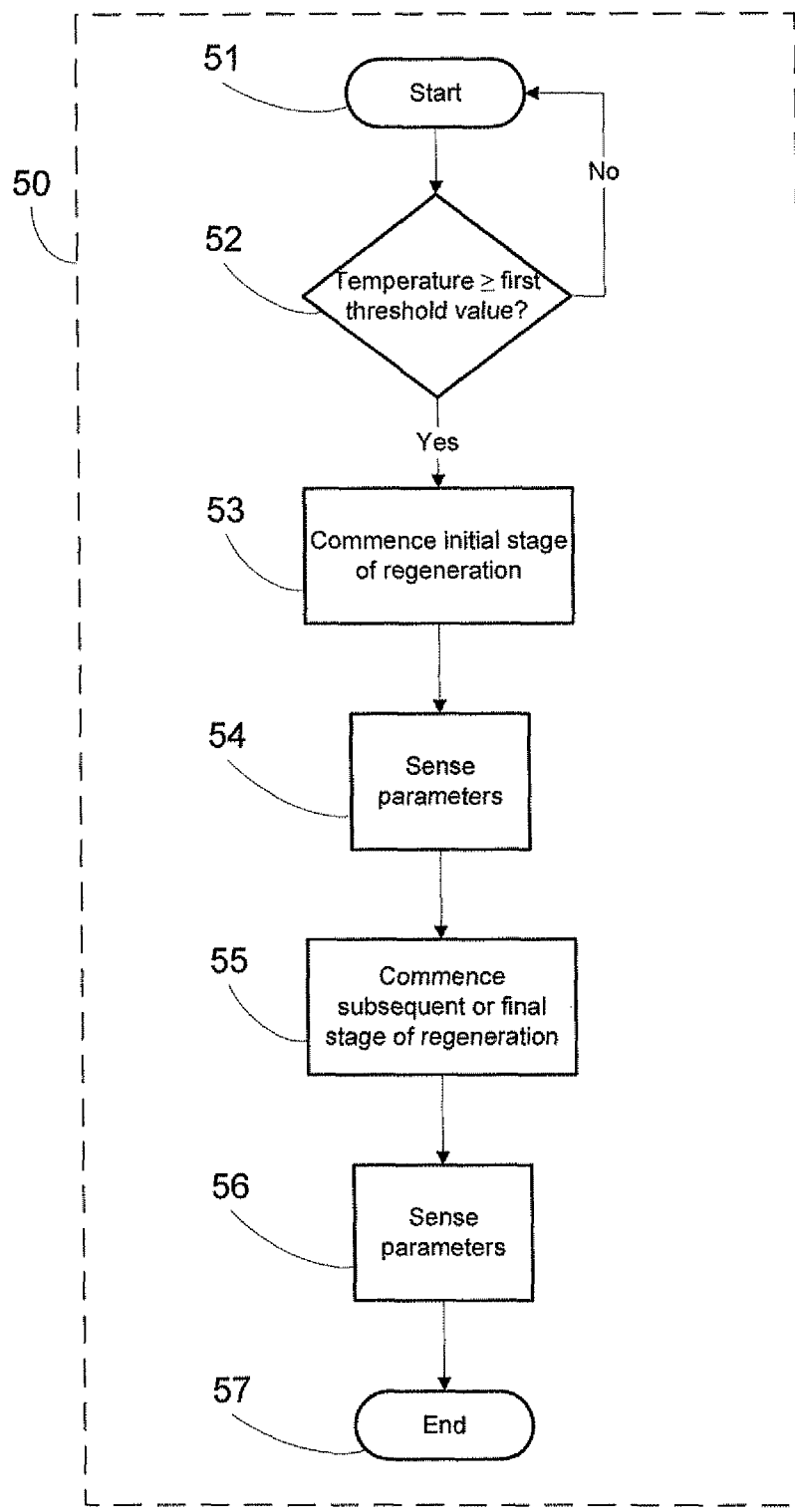
FIG. 5 is a flowchart illustrating an example embodiment of a process for regenerating a DPF.

FIG. 5 is a flowchart illustrating an example embodiment of a process that can be used to regenerate a DPF. A controller can be employed to sense one or more parameters which can trigger a desire to regenerate a DPF and can be employed to control the process. Prior to the commencement of regeneration process 50, the combustion engine is turned on, and the controller and associated sensors are energized. In step 51, the controller commences or starts the regeneration process after determining a desire to regenerate the DPF. In step 52 if the sensed temperature of the exhaust gas stream at a location downstream of the combustion engine is greater than or equal to a first threshold temperature value, the process continues to step 53. In step 52, if the sensed temperature is less than the first threshold value, the regeneration process can be delayed (for example, for a predetermined time period) before continuing back to and repeating step 51. In step 53, the controller determines the syngas flow regime and the first average flow rate of the syngas to be used, and commences the initial stage of the regeneration by controlling the introduction of syngas into the exhaust stream upstream of the DPF. In step 54, the controller senses and monitors one or more parameters, for example, elapsed time and sensed temperature to determine when to switch from the first average flow rate to the second average flow rate. In step 55, the controller determines the syngas flow regime and second average flow rate of the syngas and commences the subsequent or final stage of the regeneration process by controlling the introduction of syngas. In step 56, the controller senses and monitors one ore more parameters, for example, elapsed time, pressure drop across the DPF and sensed temperature to determine when the regeneration process can be terminated. In step 57, the controller can terminate or end the regeneration process by terminating the flow of syngas to the DPF. The determination of syngas flow regime and flow rate by the controller in step 53 and in step 55 can be based on one or more sensed parameters, for example, the exhaust stream flow rate and the sensed exhaust stream temperature. Regeneration process 50 can comprise additional stages of regeneration and corresponding average flow rates of syngas. Regeneration process 50 can also be repeated as determined by the controller.

Introducing syngas only when the exhaust stream is above a first threshold temperature, and regulating and/or reducing the average flow rate of syngas (for example, using intermittent flow, pulsed flow or just a lower average constant flow rate) until the exhaust stream and/or DPF reaches a second threshold temperature can offer advantages. For example,
  (a) the amount of CO slip can be reduced because the rate of syngas supplied to the exhaust after-treatment system is more closely matched to the maximum rate at which CO can be oxidized during the initial stage of regeneration; and/or
  (b) it can reduce the time taken to achieve a desired regeneration temperature or increase the rate of heating of DPF; and/or
  (c) it can reduce the magnitude of an initial temperature spike during the regeneration process by reducing the initial reaction rate of regeneration.

Controlling the flow rate of syngas, in order to control CO slip and the temperature of a DPF, and cycling the flow of syngas on and off in an intermittent flow regime offers the advantage of simple control strategy and use of basic components which can reduce the cost of the exhaust after-treatment system. Furthermore, in retrofit applications where space is limited and change to existing engine controls and systems is undesirable, the addition of a small number of components and simple control strategies can simplify installation and reduce installation costs.

FIG. 6 is a graph illustrating example plots of an exhaust stream temperature near the inlet to a DPF, internal temperature of the DPF and CO slip past the DPF during a regeneration process. Syngas was introduced into the exhaust stream upstream of the DPF with an intermittent flow regime at a lower first average flow rate, followed by a continuous flow regime at a second substantially constant and higher average flow rate. Plot 60 illustrates the temperature of the exhaust stream near the inlet to the DPF. Plot 61 illustrates the internal temperature of the DPF. Plot 62 illustrates CO slip past the DPF. During time period 63, syngas was introduced to the exhaust stream upstream of the DPF with an intermittent flow regime at a first average flow rate, for example, about 3 seconds on and 3 seconds off for a duration of about 100 seconds. The syngas was then switched to a continuous flow regime at a second substantially constant flow rate during time period 64. The average flow rate during period 63 was lower than during period 64. Triggers for switching from a first average flow rate to a second average flow rate can include, for example, a predetermined time period, based on a model prediction or algorithm, or look-up table; a temperature threshold of the exhaust stream at a location downstream of the combustion engine, for example, within or near the DPF, or an output of a CO concentration sensor which senses the exhaust stream composition downstream of the DPF.

A plurality of DPFs can be fluidly connected in parallel to the exhaust stream of the engine with each individual DPF (the term segment will be used herein to signify an individual DPF contained in its own individual housing or with segments contained in a common housing). One or more filter segments can be regenerated independently or simultaneously from another. A diverter valve can be used to selectively direct the flow of syngas to various segments in order to create an intermittent flow regime to a particular segment during regeneration of that segment.

The controller that controls regeneration of the DPF can be dedicated for that purpose or can be part of another controller, for example, an overall engine control module.

The engine can be a lean burn combustion engine fueled by diesel, natural gas, propane, or gasoline. The engine system can comprise additional devices which utilize a syngas stream for example, a lean NOx trap, selective catalytic reactor (SCR), diesel oxidation catalyst (DOC) and or a fuel cell. A diverter valve can be used to selectively direct the flow of syngas stream to such additional devices. The engine can be part of a vehicular or non-vehicular system.

The fuel processor can be a variety of other types including, steam reformers (SR), partial oxidation (POX) reactors or autothermal reformers (ATR). The fuel processors can be catalytic or non-catalytic fuel processors.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of regenerating a diesel particulate filter comprising:
  (a) directing an exhaust stream from a combustion engine through said diesel particulate filter;
  (b) sensing the temperature of said exhaust gas stream at a location downstream of said combustion engine;
  (c) determining said temperature is at or above a first temperature threshold value at which an amount of CO slip past said diesel particulate filter is at or below a predetermined low level;
  (d) selectively introducing a syngas stream at least periodically into said diesel particulate filter to regenerate said diesel particulate filter by:
    (i) introducing said syngas stream at a first average flow rate during an initial regeneration stage when said sensed temperature is at or above said first temperature threshold value at which said amount of CO slip past said diesel particulate filter is at or below said predetermined low level, and
    (ii) introducing said syngas stream at a second average flow rate greater than said first average flow rate, during a subsequent regeneration stage.

2. The method of claim 1 wherein said first average flow rate and second average flow rate are selected based on a flow rate of said exhaust stream and on said sensed temperature of said exhaust stream.

3. The method of claim 1 wherein said first average flow rate and second average flow rate are selected based on a speed of said combustion engine and said sensed temperature of said exhaust stream.

4. The method of claim 1 wherein during said initial regeneration stage said sensed temperature of the exhaust stream is raised from first threshold temperature value to a second threshold temperature value.

5. The method of claim 1 wherein said syngas is introduced into said diesel particulate filter at said second average flow rate once said sensed temperature reaches a second threshold temperature value.

6. The method of claim 1 wherein said syngas is introduced into said diesel particulate filter at said first average flow rate for a predetermined time period and is then introduced into said diesel particulate filter at said second average flow rate once said predetermined time period has elapsed.

7. The method of claim 1 wherein said syngas introduction into said diesel particulate filter is switched from said first average flow rate to said second average flow rate based on the CO concentration in said exhaust stream downstream of said diesel particulate filter.

8. The method of claim 1 wherein said syngas introduction into said diesel particulate filter is switched from said first average flow rate to said second average flow rate based on an output from a CO concentration sensor located downstream of said diesel particulate filter.

9. The method of claim 1 wherein the flow rate of said syngas is varied during said initial regeneration stage.

10. The method of claim 8 wherein said syngas is introduced into said diesel particulate filter intermittently during said initial regeneration stage.

11. The method of claim 9 wherein said syngas is introduced into said diesel particulate filter with pulsed flow during said initial regeneration stage.

12. The method of claim 11 wherein said first average flow rate is achieved by switching the flow of said syngas stream on and off.

13. The method of claim 1 wherein said first average flow rate is achieved by directing a portion of said syngas stream to another syngas-consuming device.

14. The method of claim 1 wherein said first average flow rate is achieved by adjusting the hydrogen content of said syngas stream.

15. The method of claim 1 wherein said first average flow rate and said second average flow rate are controlled by a controller and algorithm.

16. The method of claim 1 wherein the flow rate of said syngas is constant during said subsequent regeneration stage.

17. The method of claim 1 wherein said syngas stream is produced by a fuel processor.

18. The method of claim 17 wherein said syngas introduction into said diesel particulate filter is switched from said first average flow rate to said second average flow rate by adjusting the syngas output of said fuel processor.

19. The method of claim 1 wherein said first temperature threshold value is a temperature at which the CO in the syngas stream can be oxidized by a catalyst in said diesel particulate filter.

* * * * *